United States Patent
Zhong et al.

(10) Patent No.: US 11,616,218 B2
(45) Date of Patent: Mar. 28, 2023

(54) DRY ELECTRODE MANUFACTURE BY TEMPERATURE ACTIVATION METHOD

(71) Applicant: LICAP TECHNOLOGIES, INC., Sacramento, CA (US)

(72) Inventors: Linda Zhong, Sacramento, CA (US); Kathleen Qiu, Sacramento, CA (US); Martin Zea, Sacramento, CA (US); Erika Shaw, Sacramento, CA (US)

(73) Assignee: LICAP TECHNOLOGIES, INC., Sacramento, CA (US)

( * ) Notice: Subject to any disclaimer, the term of this patent is extended or adjusted under 35 U.S.C. 154(b) by 289 days.

(21) Appl. No.: 16/874,502

(22) Filed: May 14, 2020

(65) Prior Publication Data
US 2020/0388822 A1    Dec. 10, 2020

Related U.S. Application Data

(60) Provisional application No. 62/857,144, filed on Jun. 4, 2019.

(51) Int. Cl.
*H01M 4/04* (2006.01)
*H01M 4/139* (2010.01)

(52) U.S. Cl.
CPC ....... *H01M 4/0433* (2013.01); *H01M 4/0471* (2013.01)

(58) Field of Classification Search
None
See application file for complete search history.

(56) References Cited

U.S. PATENT DOCUMENTS

| | | |
|---|---|---|
| 5,776,637 A | 7/1998 | Kashio et al. |
| 7,090,946 B2 | 8/2006 | Mitchell et al. |
| 7,102,877 B2 | 9/2006 | Mitchell et al. |
| 7,295,432 B2 | 11/2007 | Xu |
| 7,297,300 B2 | 11/2007 | Ozaki et al. |
| 7,352,558 B2 | 4/2008 | Zhong et al. |
| 7,492,571 B2 | 2/2009 | Zhong et al. |
| 7,495,349 B2 | 2/2009 | Mitchell et al. |
| 7,508,651 B2 | 3/2009 | Mitchell et al. |
| 7,791,860 B2 | 9/2010 | Mitchell et al. |

(Continued)

FOREIGN PATENT DOCUMENTS

| | | |
|---|---|---|
| DE | 102017208220 A1 | 11/2018 |
| GB | 1421514 A | 1/1976 |

(Continued)

OTHER PUBLICATIONS

European Search Report for EP20176071; dated Oct. 13, 2020.

(Continued)

*Primary Examiner* — Tracy M Dove
(74) *Attorney, Agent, or Firm* — Stetina Brunda Garred and Brucker; Mark B. Garred

(57) ABSTRACT

A method of manufacturing a free-standing electrode film includes preparing a mixture including an electrode active material, a conductive material, and a binder, heating the mixture to 70° C. or higher, subjecting the mixture to a shear force, and, after the mixture has been subjected to the shear force, pressing the mixture into a free-standing film. The method may further include adding a solvent to the mixture. A resulting free-standing electrode film may include an amount of binder less than 4% by weight.

26 Claims, 4 Drawing Sheets
(3 of 4 Drawing Sheet(s) Filed in Color)

(56) References Cited

U.S. PATENT DOCUMENTS

| | | |
|---|---|---|
| 7,791,861 B2 | 9/2010 | Zhong et al. |
| 8,072,734 B2 | 12/2011 | Zhong et al. |
| 8,213,156 B2 | 7/2012 | Mitchell et al. |
| 10,741,843 B2 | 8/2020 | Duong et al. |
| 2004/0164440 A1 | 8/2004 | Ozaki et al. |
| 2005/0271798 A1 | 12/2005 | Zhong et al. |
| 2013/0183577 A1 | 7/2013 | Voillequin et al. |
| 2015/0303481 A1 | 10/2015 | Duong et al. |
| 2017/0250438 A1 | 8/2017 | Barde et al. |
| 2018/0175366 A1 | 6/2018 | Zheng et al. |
| 2020/0358100 A1 | 11/2020 | Duong et al. |

FOREIGN PATENT DOCUMENTS

| | | | |
|---|---|---|---|
| JP | 09289023 | A | 11/1997 |
| JP | 11003701 | A | 1/1999 |
| JP | 2004186190 | A | 7/2004 |
| JP | 2004186191 | A | 7/2004 |
| JP | 3693254 | B2 | 9/2005 |
| JP | 3793751 | B2 | 7/2006 |
| JP | 2013152932 | A | 8/2013 |
| JP | 2017517862 | A | 6/2017 |
| JP | 2017536650 | A | 12/2017 |
| KR | 20180102390 | | 9/2018 |

OTHER PUBLICATIONS

Japanese Office Action for Application No. 2020-097944; dated Dec. 7, 2021.
Japanese Office Action for Application No. 2020-097944; dated Jul. 14, 2021.
Third Party Obersvation for Patent No. EP20200176071; mailed Jun. 15, 2022 (12 pages).
Third Party Submission of Prior Art for JP2020-097944; mailed Mar. 14, 2022.
European Office Action for Application No. EP20200176071; dated Oct. 31, 2022 (14 pages).

DRY ELECTRODE MANUFACTURE BY TEMPERATURE ACTIVATION METHOD

CROSS-REFERENCE TO RELATED APPLICATIONS

This application relates to and claims the benefit of U.S. Provisional Application No. 62/857,144, filed Jun. 4, 2019 and entitled "DRY ELECTRODE MANUFACTURE BY TEMPERATURE ACTIVATION METHOD," the entire disclosure of which is hereby incorporated by reference.

STATEMENT RE: FEDERALLY SPONSORED RESEARCH/DEVELOPMENT

Not Applicable

BACKGROUND

1. Technical Field

The present disclosure relates generally to manufacturing electrodes for energy storage devices such as batteries and, more particularly, to the manufacture of a free-standing electrode film by a dry process.

2. Related Art

As demand for inexpensive energy storage devices increases, various methods have been proposed for manufacturing electrodes. Among these, there exist so-called "dry" processes by which a free-standing electrode film may be manufactured while avoiding the expense and drying time associated with the solvents and aqueous solutions that are typically used in slurry coating and extrusion processes. In order to produce higher quality electrodes by such a dry process that may result in energy storage devices having higher energy density, the amount of binder mixed with the active material should be minimized within a range that still allows for an electrode film to be reliably produced without excessive breakage. To this end, the binder may be activated to improve its adhesion strength by the addition of a highly vaporizable solvent as described in the present inventor's own U.S. Pat. No. 10,069,131, entitled "Electrode for Energy Storage Devices and Method of Making Same," the entirety of the disclosure of which is wholly incorporated by reference herein. However, further reduction in the amount of binder needed is desirable, especially in the case of producing electrodes for batteries, where maximizing the active material loading is essential to maximizing the energy density of the battery.

BRIEF SUMMARY

The present disclosure contemplates various methods for overcoming the drawbacks accompanying the related art. One aspect of the embodiments of the present disclosure is a method of manufacturing a free-standing electrode film. The method may include preparing a mixture including an electrode active material, a conductive material, and a binder, heating the mixture to 70° C. or higher, after said heating, subjecting the mixture to a shear force, and, after the mixture has been subjected to the shear force, pressing the mixture into a free-standing film.

The method may further include adding a solvent to the mixture before the mixture is subjected to the shear force. Adding the solvent to the mixture may be performed after the heating.

The method may further include adding a solvent to the mixture while the mixture is being subjected to the shear force.

Subjecting the mixture to the shear force may include mixing the mixture in a high shear mixer, such as a kitchen or industrial blender (e.g. a Waring® blender), a cyclomixer, a jet mill, a bead mill, a planetary mixer, a paddle mixer, etc.

The pressing may include applying a roller press to the mixture.

The solvent may have a boiling point of less than 130° C. or less than 100° C. The solvent may include one or more chemicals selected from the group consisting of: a hydrocarbon, an acetate ester, an alcohol, a glycol, ethanol, methanol, isopropanol, acetone, diethyl carbonate, and dimethyl carbonate.

Another aspect of the embodiments of the present disclosure is a method of manufacturing a free-standing electrode film. The method may include preparing a mixture including an electrode active material, a conductive material, and a binder, adding a solvent to the mixture, after the solvent has been added to the mixture, subjecting the mixture to a shear force, after the mixture has been subjected to the shear force, heating the mixture to 70° C. or higher, and, after heating, pressing the mixture into a free-standing film.

Subjecting the mixture to a shear force may include mixing the mixture in a high shear mixer, such as a kitchen or industrial blender (e.g. a Waring® blender), a cyclomixer, a jet mill, a bead mill, a planetary mixer, a paddle mixer, etc.

The pressing may include applying a roller press to the mixture.

The solvent may have a boiling point of less than 130° C. or less than 100° C. The solvent may include one or more chemicals selected from the group consisting of: a hydrocarbon, an acetate ester, an alcohol, a glycol, ethanol, methanol, isopropanol, acetone, diethyl carbonate, and dimethyl carbonate.

Another aspect of the embodiments of the present disclosure is a method of manufacturing an electrode. The method may include performing any of the above methods of manufacturing a free-standing electrode film and laminating the resulting free-standing film on a current collector.

Another aspect of the embodiments of the present disclosure is a free-standing electrode film including an electrode active material, a conductive material, and one or more binders, the one or more binders totaling around 4% by weight of the free-standing electrode film, and in some cases less than 4%.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the various embodiments disclosed herein will be better understood with respect to the following description and drawings, in which like numbers refer to like parts throughout, and in which.

DETAILED DESCRIPTION

The present disclosure encompasses various embodiments of methods for manufacturing a free-standing electrode film or an electrode produced therefrom. The detailed description set forth below in connection with the appended drawings is intended as a description of several currently contemplated embodiments, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
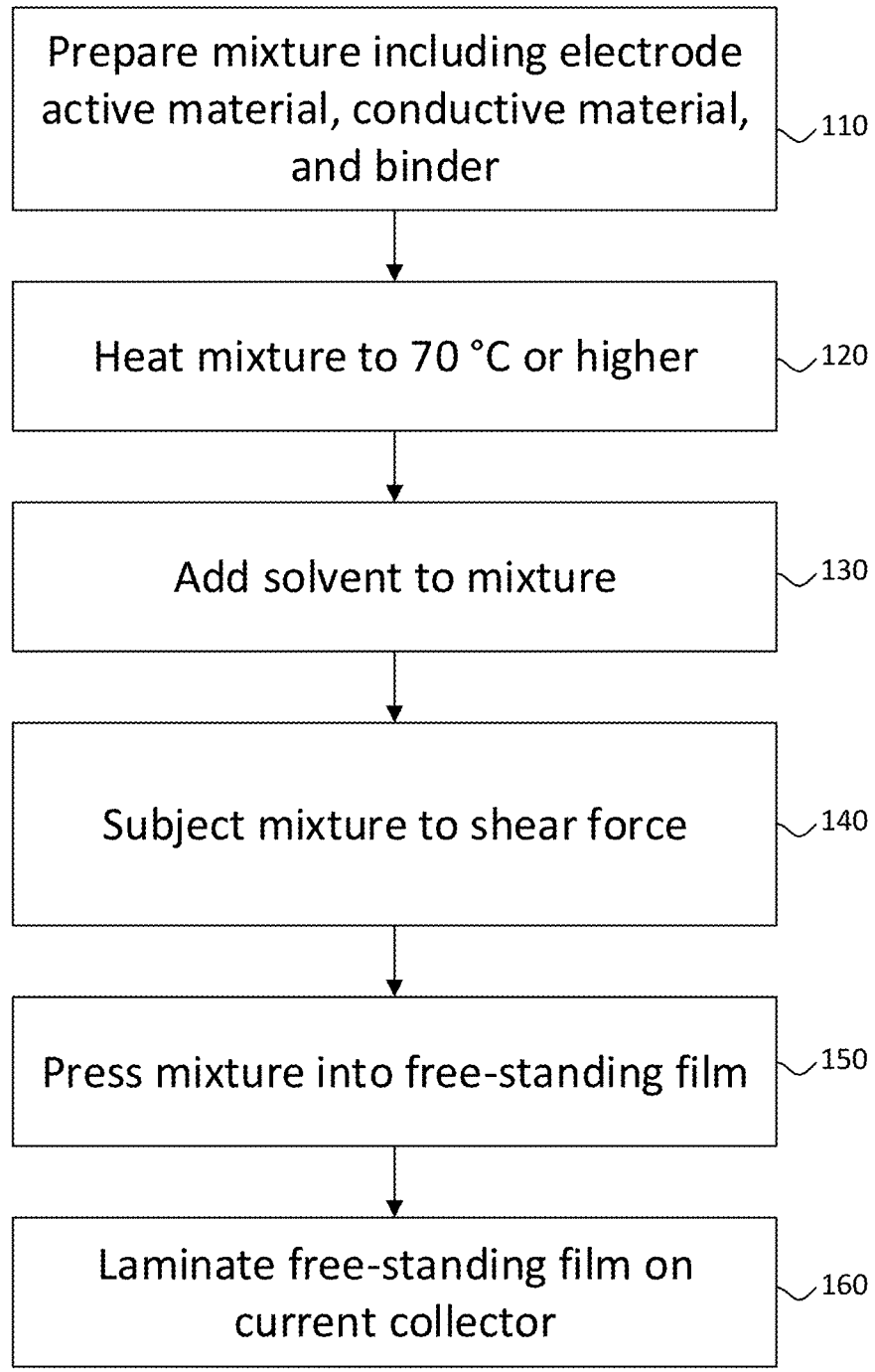
FIG. 1 shows an operational flow for manufacturing a free-standing electrode film or an electrode produced therefrom.

FIG. 1 shows an operational flow for manufacturing a free-standing electrode film or an electrode produced therefrom. Unlike conventional dry processes, the process exemplified by FIG. 1 may include a temperature activation step that may be performed instead of or in addition to the solvent activation contemplated by U.S. Pat. No. 10,069,131. In the temperature activation step, the temperature of the binder used to form the free-standing electrode film may be raised, causing the binder to become softer and able to stretch longer and finer before breaking. As a result, the amount of binder needed to reliably produce a free-standing electrode film may be reduced.

The operational flow of FIG. 1 may begin with a step 110 of preparing a mixture (e.g. a powder mixture) including an electrode active material, a conductive material, and a binder. Depending on the energy storage device to be produced, the electrode active material may be, for example, activated carbon, graphite, hard carbon, or a metal oxide such as manganese dioxide, with the conductive material comprising metal particles or conductive carbon such as activated carbon, graphite, hard carbon, or carbon black. In the case of manufacturing an electrode for use in a battery, the electrode active material may be, for example, lithium manganese oxide (LMO) in an amount 82-99 percent (e.g. 93%) by weight of the mixture and the conductive material may be, for example, activated carbon in an amount 0-10 percent (e.g. 3.5%) by weight of the mixture. The binder may, for example, be polytetrafluoroethylene (PTFE) or another thermoplastic polymer and may be in an amount 1-8 percent by weight of the mixture, preferably equal to or less than 4 percent, more preferably less than 4% (e.g. 3.5%).

The operational flow of FIG. 1 may continue with a temperature activation step 120 of heating the mixture to 70° C. or higher, preferably 100° C. or higher, and, in some cases, a solvent activation step 130 of adding a solvent to the mixture. In the temperature activation step 120, the temperature to which the mixture is heated may be less than the glass transition temperature of the binder (e.g. 114.85° C. for PTFE), as softening of the binder may occur prior to reaching the glass temperature. Alternatively, the mixture may be heated to a temperature equal to or greater than the glass temperature of the binder. The solvent activation step 130, if performed, may cause the binder to soften further and become more able to stretch without breaking. Unlike solvents such as N-Methyl-2-pyrrolidone (NMP) that may be difficult to remove and entail lengthy drying processes, the solvent added in the solvent activation step 130 may have a relatively low boiling point of less than 130° C. or less than 100° C. (i.e. less than the boiling point of water). The solvent may include one or more chemicals selected from the group consisting of a hydrocarbon, an acetate ester, an alcohol, a glycol, ethanol, methanol, isopropanol, acetone, diethyl carbonate, and dimethyl carbonate. Unlike slurry coating and extrusion processes in which the solvent may be 60-80% by weight of the resulting wet mixture, the present disclosed process may add a relatively small amount of solvent in step 130, amounting to less than 20% of the resulting mixture. For example, the ratio of the powder mixture to the added solvent may be around 100:3.

With the binder having been activated by one or both of the activation steps 120, 130, the operational flow of FIG. 1 may continue with a step 140 of subjecting the mixture to a shear force. The mixture may, for example, be blended in a blender, such as an ordinary kitchen blender or an industrial blender. Adequate shear force to deform (e.g. elongate) the binder, resulting in a stickier, more pliable mixture, may be achieved by blending the mixture in such a blender at around 10,000 RPM for 1-10 min (e.g. 5 min). As another example, instead of being blended in a blender, the mixture may be ground in a jet mill.

After the mixture has been subjected to the shear force, the operational flow of FIG. 1 may continue with a step 150 of pressing the mixture to produce a free-standing film, for example, using a roller press. The resulting free-standing film, which may have an amount of binder less than 4% by weight of the free-standing electrode film, may thereafter be laminated on a current collector (e.g. copper or aluminum) to produce an electrode in a step 160.

As noted above, the solvent activation step 130 may be completely omitted, with the binder still being adequately activated by the temperature activation step 120. In such case, step 140 of subjecting the mixture to a shear force (e.g. using a blender of jet mill) may follow the temperature activation step 120. In the case of a "dual activation" process including both the temperature activation step 120 and the solvent activation step 130, the shear force of step 140 may be applied after the binder has been activated by one or both of the activation steps 120, 130 as noted above. For example, steps 120, 130, and 140 may be performed one after the other in the order shown in FIG. 1. Alternatively, the solvent activation step 130 may be combined with step 140 such that, for example, the solvent may be injected into the mixture while the mixture is being subjected to the shear force. As another possibility, steps 130 and 140, whether subsequently performed or combined, may precede the temperature activation step 120, such that the two activation steps 120, 130 occur respectively before and after the mixture is subjected to the shear force in step 140.

Figure 2:
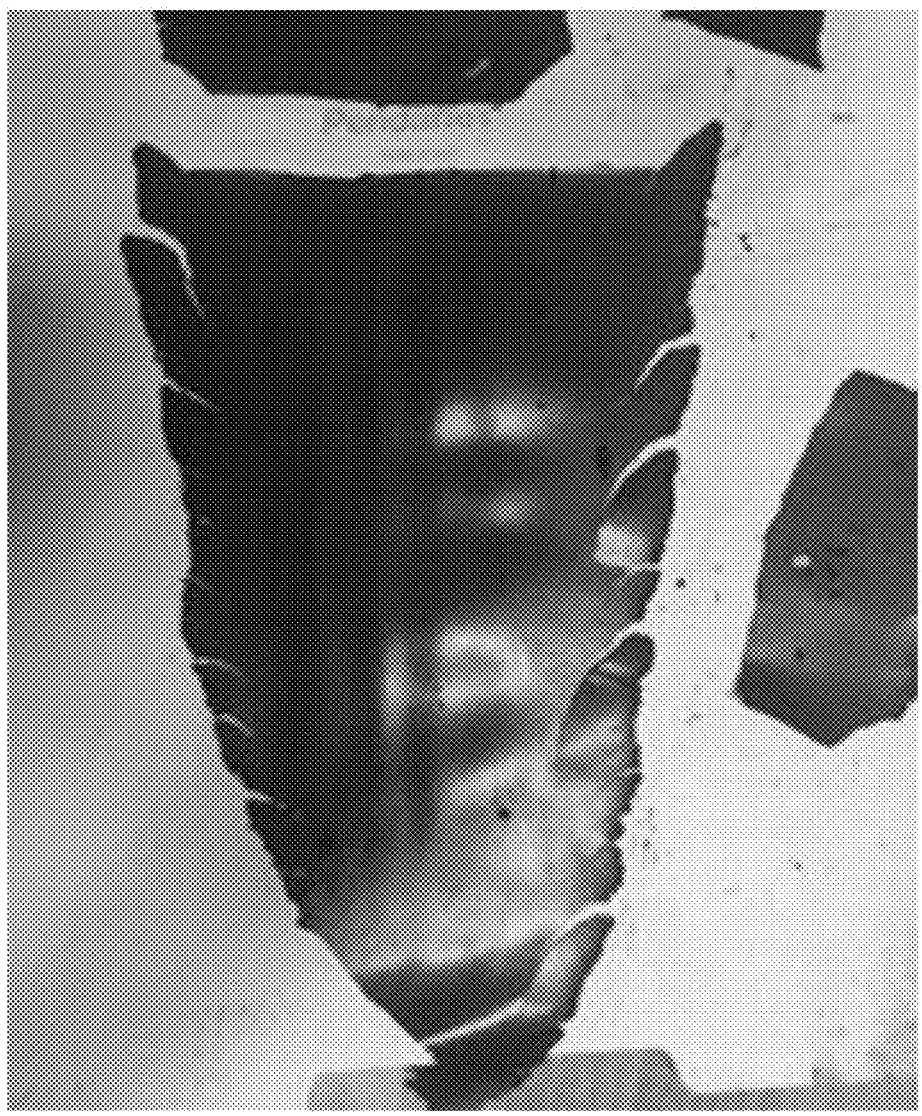
FIG. 2 shows a free-standing electrode film produced by a process having no activation step.

FIG. 2 shows a free-standing electrode film produced by a process having no activation step. In accordance with step 110 of FIG. 1, a mixture was prepared including 93% lithium manganese oxide (LMO) as an electrode active material, 3.5% activated carbon as a conductive material, and polytetrafluoroethylene (PTFE) as a binder. In accordance with step 140, the mixture was subjected to a shear force by being blended in a Waring® blender for five minutes. Then, in accordance with step 150, the mixture was pressed by a roller press at a temperature of 150° C. and a roll gap of 20 μm. As can be seen in FIG. 1, the resulting film fell apart into a few pieces. The film was relatively thick at around 400 μm, which would make it difficult to achieve a typical final electrode thickness of less than 200 µm.

Figure 3:
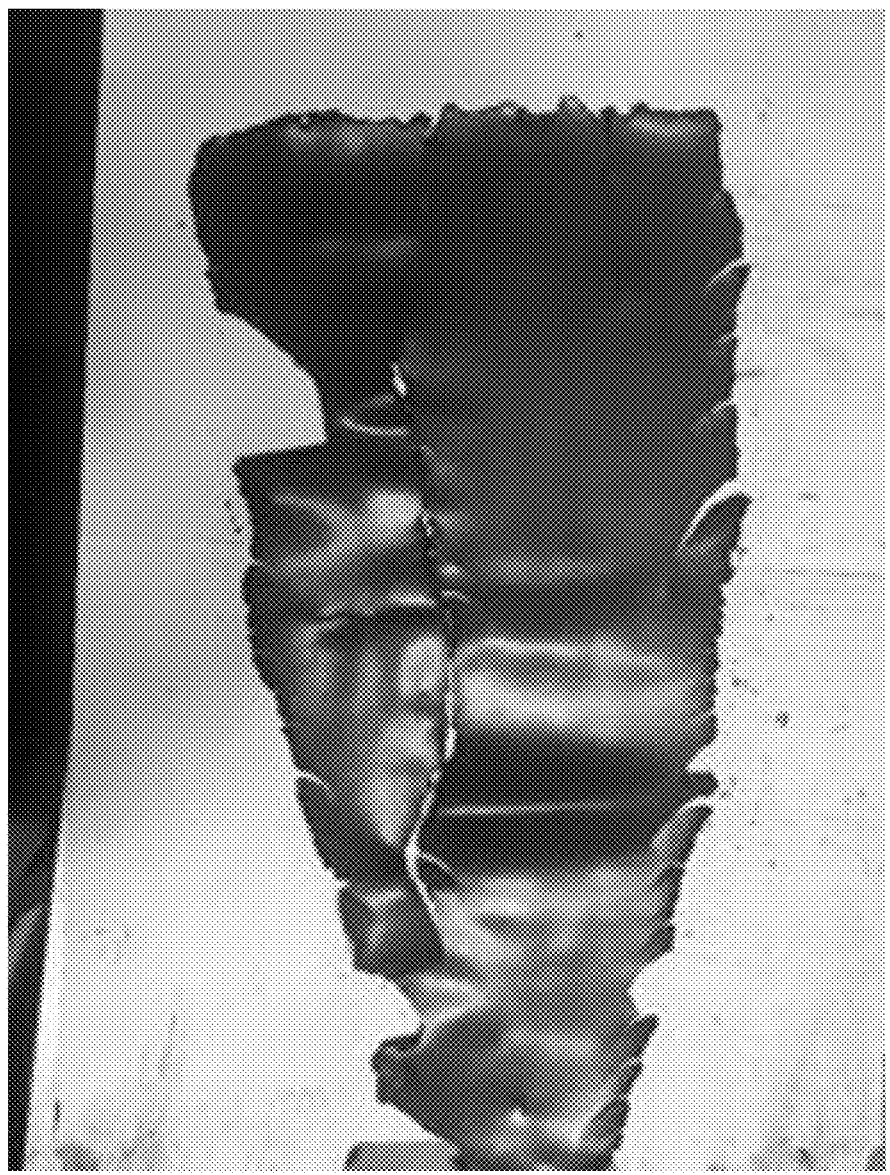
FIG. 3 shows a free-standing electrode film produced by a single activation process having only a solvent activation step.

FIG. 3 shows a free-standing electrode film produced by a single activation process having only a solvent activation step. Again, in accordance with step 110 of FIG. 1, a mixture was prepared including 93% lithium manganese oxide (LMO) as an electrode active material, 3.5% activated carbon as a conductive material, and polytetrafluoroethylene (PTFE) as a binder. This time, however, acetone was added in a solvent activation step 130 at a powder mixture to acetone ratio of 100:3. In accordance with step 140, the mixture was then subjected to a shear force by being blended in a Waring® blender for five minutes. Then, in accordance with step 150, the mixture was pressed by a roller press at a temperature of 150° C. and a roll gap of 20 µm. As can be seen in FIG. 3, the resulting film remained mostly in one piece, but with a large slit in the middle. Owing to being more flexible and less brittle than the film of FIG. 2, the film was somewhat thinner at around 380 µm.

Figure 4:
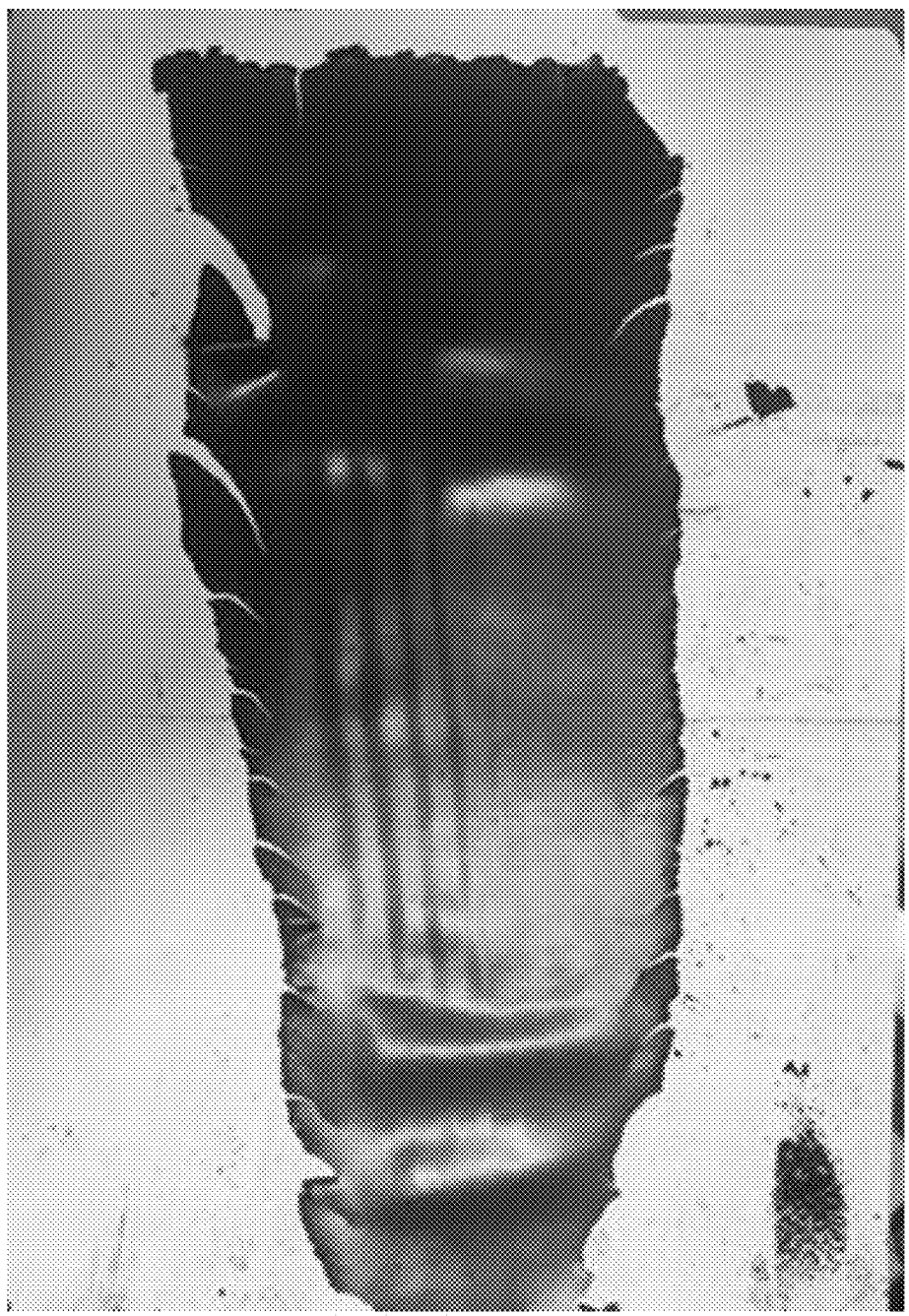
FIG. 4 shows a free-standing electrode film produced by a dual activation process having both a solvent activation step and a temperature activation step.

FIG. 4 shows a free-standing electrode film produced by a dual activation process having both a solvent activation step and a temperature activation step. Again, in accordance with step 110 of FIG. 1, a mixture was prepared including 93% lithium manganese oxide (LMO) as an electrode active material, 3.5% activated carbon as a conductive material, and polytetrafluoroethylene (PTFE) as a binder. Also, as in the example of FIG. 3, acetone was added in a solvent activation step 130 at a powder mixture to acetone ratio of 100:3. In accordance with step 140, the mixture was then subjected to a shear force by being blended in a Waring® blender for five minutes. In accordance with step 150, the mixture was similarly pressed by a roller press at a temperature of 150° C. and a roll gap of 20 µm. This time, however, prior to pressing the mixture, the mixture was set on the roller press and preheated at 150° C. for 10 minutes in a temperature activation step 120, during which the temperature of the mixture reached 70° C. or higher. As can be seen in FIG. 4, the resulting film remained in one piece. Also, owing to being more flexible and less brittle than the film of FIG. 3, the film was even thinner at around 360 µm.

The experimental results described in relation to FIG. 2-4 are summarized in the following table.

TABLE 1

|  | Comparative Example 1 (FIG. 2) | Comparative Example 2 (FIG. 3) | Embodiment Example (FIG. 4) |
| --- | --- | --- | --- |
| Powder Composition | 93% LMO, 3.5% activated carbon, 3.5% PTFE | 93% LMO, 3.5% activated carbon, 3.5% PTFE | 93% LMO, 3.5% activated carbon, 3.5% PTFE |
| Binder Activation | No activation | Solvent activation: powder acetone ratio of 100:3 | Dual activation: to powder to acetone ratio of 100:3 preheated at 150° C. for 10 minutes prior to pressing |
| Shear Force | Blended in Waring® blender for 5 minutes | Blended in Waring® blender for 5 minutes | Blended in Waring® blender for 5 minutes |
| Pressing Condition | Pressed by roller press at 150° C. at roll gap of 20 µm | Pressed by roller press at 150° C. at roll gap of 20 µm | Pressed by roller press at 150° C. at roll gap of 20 µm |

TABLE 1-continued

|  | Comparative Example 1 (FIG. 2) | Comparative Example 2 (FIG. 3) | Embodiment Example (FIG. 4) |
| --- | --- | --- | --- |
| Film Quality | Film fell apart into a few pieces | Film almost in one piece but with large slit in the middle, more flexible and less brittle than Comp. Example 1 | Film in one piece, more flexible and less brittle than Comp. Example 2 |
| Film Thickness | 400 µm | 380 µm | 360 µm |

As can be understood from the above Table 1 and FIGS. 2-4, for a given quantity of binder (e.g. 3.5% PTFE), the addition of a temperature activation step 120 may result in a free-standing electrode film having superior quality and thickness relative to a dry method having only a solvent activation step 130. As such, the disclosed methods can be understood to reduce the quantity of binder needed to produce a free-standing electrode film of acceptable quality.

According to the disclosed methods, a free-standing electrode film can be produced comprising an electrode active material, a conductive material, and one or more binders totaling less than 4% by weight of the free-standing electrode film. Such a free-standing electrode film with reduced quantity of binder can be laminated to a current collector to produce an electrode for use in batteries, ultracapacitors, lithium ion capacitors (LIC), fuel cells, and other energy storage devices having higher energy density and lower manufacturing costs.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a free-standing electrode film, the method comprising:
    preparing a mixture including an electrode active material, a conductive material, and polytetrafluoroethylene (PTFE);
    heating the mixture to 70° C. or higher;
    after said heating, subjecting the mixture to a shear force; and,
    after the mixture has been subjected to the shear force, pressing the mixture into a film to produce the free-standing electrode film.

2. The method of claim 1, further comprising adding a solvent to the mixture before the mixture is subjected to the shear force.

3. The method of claim 2, wherein said adding the solvent to the mixture is performed after said heating.

4. The method of claim 1, further comprising adding a solvent to the mixture while the mixture is being subjected to the shear force.

5. The method of claim 1, wherein said subjecting the mixture to the shear force includes blending the mixture in a blender.

6. The method of claim 1, wherein said subjecting the mixture to the shear force includes grinding the mixture in a jet mill.

7. The method of claim 1, wherein said pressing includes applying a roller press to the mixture.

8. The method of claim 1, further comprising adding a solvent to the mixture before the mixture is subjected to the shear force or while the mixture is being subjected to the shear force, wherein the solvent has a boiling point of less than 130° C.

9. The method of claim 8, wherein the solvent has a boiling point of less than 100° C.

10. The method of claim 1, further comprising adding a solvent to the mixture before the mixture is subjected to the shear force or while the mixture is being subjected to the shear force, wherein the solvent comprises one or more chemicals selected from the group consisting of: a hydrocarbon, an acetate ester, an alcohol, a glycol, ethanol, methanol, isopropanol, acetone, diethyl carbonate, and dimethyl carbonate.

11. A method of manufacturing an electrode, the method comprising:
the method of claim 1; and
laminating the free-standing electrode film on a current collector.

12. A method of manufacturing a free-standing electrode film, the method comprising:
preparing a mixture including an electrode active material, a conductive material, and polytetrafluoroethylene (PTFE);
adding a solvent to the mixture;
after the solvent has been added to the mixture, subjecting the mixture to a shear force;
after the mixture has been subjected to the shear force, heating the mixture to 70° C. or higher; and,
after said heating, pressing the mixture into a film to produce the free-standing electrode film.

13. The method of claim 12, wherein said subjecting the mixture to the shear force includes blending the mixture in a blender.

14. The method of claim 12, wherein said subjecting the mixture to the shear force includes grinding the mixture in a jet mill.

15. The method of claim 12, wherein said pressing includes applying a roller press to the mixture.

16. The method of claim 12, wherein the solvent has a boiling point of less than 130° C.

17. The method of claim 16, wherein the solvent has a boiling point of less than 100° C.

18. The method of claim 12, wherein the solvent comprises one or more chemicals selected from the group consisting of: a hydrocarbon, an acetate ester, an alcohol, a glycol, ethanol, methanol, isopropanol, acetone, diethyl carbonate, and dimethyl carbonate.

19. A method of manufacturing an electrode, the method comprising:
the method of claim 12; and
laminating the free-standing electrode film on a current collector.

20. A method of manufacturing a free-standing electrode film, the method comprising:
preparing a mixture including an electrode active material, a conductive material, polytetrafluoroethylene (PTFE), and a solvent;
subjecting the mixture to a shear force;
after the mixture has been subjected to the shear force, heating the mixture to 70° C. or higher; and,
after said heating, pressing the mixture into a film to produce the free-standing electrode film.

21. The method of claim 12, wherein the solvent amounts to less than 20% of the mixture.

22. The method of claim 21, wherein a ratio of the the solvent to the rest of the mixture is around 3:100.

23. The method of claim 20, wherein the solvent amounts to less than 20% of the mixture.

24. The method of claim 23, wherein a ratio of the solvent to the rest of the mixture is around 3:100.

25. The method of claim 20, wherein said heating is performed on the roller press.

26. The method of claim 25, wherein said heating is performed for 10 minutes.

* * * * *